(12) United States Patent
Lohse

(10) Patent No.: US 10,246,358 B1
(45) Date of Patent: Apr. 2, 2019

(54) AUTOMATED PRIMARY CONDENSATE DRAIN LINE CHLORINATION SYSTEM AND METHOD

(71) Applicant: John William Lohse, Katy, TX (US)

(72) Inventor: John William Lohse, Katy, TX (US)

(*) Notice: Subject to any disclaimer, the term of this patent is extended or adjusted under 35 U.S.C. 154(b) by 0 days.

(21) Appl. No.: 15/635,160

(22) Filed: Jun. 27, 2017

Related U.S. Application Data

(60) Provisional application No. 62/355,258, filed on Jun. 27, 2016.

(51) Int. Cl.
C02F 1/50 (2006.01)
C02F 1/76 (2006.01)
F25D 21/14 (2006.01)

(52) U.S. Cl.
CPC ............... C02F 1/76 (2013.01); C02F 1/50 (2013.01); F25D 21/14 (2013.01); C02F 2303/04 (2013.01)

(58) Field of Classification Search
CPC .. C02F 1/76; C02F 1/50; C02F 1/4606; C02F 2305/00; F25D 21/14; F24F 13/222
USPC ..................................................... 62/150, 285
See application file for complete search history.

(56) References Cited

U.S. PATENT DOCUMENTS

| | | | |
|---|---|---|---|
| 3,928,017 A * | 12/1975 | Douros, Jr. .............. | C02F 1/50 504/155 |
| 5,402,813 A | 4/1995 | Keen | |
| 7,740,025 B2 | 6/2010 | Scaringe | |
| 8,075,769 B1 | 12/2011 | Gleason et al. | |
| 8,646,474 B2 * | 2/2014 | Pearson ............... | B60H 1/3233 137/15.04 |
| 2009/0165868 A1 | 7/2009 | Pearson | |
| 2011/0061745 A1 | 3/2011 | Pearson | |
| 2014/0116530 A1 | 5/2014 | Pearson | |
| 2017/0152655 A1 * | 6/2017 | Abunameh ............... | E03D 9/05 |

FOREIGN PATENT DOCUMENTS

JP 09287829 A * 11/1997

* cited by examiner

Primary Examiner — Filip Zec
Assistant Examiner — Chang H. Park
(74) Attorney, Agent, or Firm — Kenneth A. Roddy

(57) ABSTRACT

An automated primary condensate drain line chlorination system includes a first T-fitting installed in an existing municipal water supply line that contains chlorine and algaecides, a second T-fitting installed between an outlet of an existing primary condensation tray of the central air conditioning system and the existing primary condensate drain line, a water supply line extending between the T-fittings, and a normally closed solenoid valve installed in the water supply line between the T-fittings operatively connected with the electrical circuit of the thermostat and fan motor of the central air conditioning system. The solenoid valve opens automatically upon operation of the fan of the evaporator unit of the central air conditioning system to allow a small amount of water from the municipal water supply line to flow into the primary condensation tray and the primary condensate drain line to prevent the growth of algae and/or fungus therein.

1 Claim, 1 Drawing Sheet

AUTOMATED PRIMARY CONDENSATE DRAIN LINE CHLORINATION SYSTEM AND METHOD

CROSS REFERENCE TO RELATED APPLICATION

This application claims priority of U.S. Provisional Application Ser. No. 62/355,258, filed on Jun. 27, 2016.

BACKGROUND OF THE INVENTION

1. Field of the Invention

This invention relates generally to apparatus and methods for cleaning condensate drain lines and, more particularly, to an automated primary condensate drain line chlorination system and method which automatically introduces water containing chlorine and algaecides into the primary condensate drain line of an air conditioning system upon operation of the air conditioning system to prevent microbial growth and clogging.

2. Background Art

In a conventional central air conditioning system, also known as a "split" system, a condenser unit is located outside of the home or building to be conditioned and an evaporator is located inside. The condenser cools the refrigerant which loses its heat to the ambient air outside of the home or building and condenses into its liquid state. The cooled refrigerant is then carried into the home or building where it passes through the evaporator coils located in the air handler unit. Typically, the air handler unit is located in a crawl space in an attic area. Inside the air handling unit, a motor-driven fan passes air from within the conditioned space over the evaporator coils, transferring heat from the inside air to the coils and blows the cooled air into the conditioned space. During the refrigeration cycle, moisture condenses on the evaporator coils and drips into a primary condensation pan or tray located beneath the coils within the air handling unit. The primary condensation pan or tray typically has an outlet connected to a primary condensate drain line, which directs it through a P-trap and to a drain, sewer system, or an outside area where water can drip without damaging the home or building.

However, the primary condensate drain line leading from the primary condensation tray frequently becomes clogged due to algae and/or fungus growing in the tray and/or the primary condensate drain line or from debris blocking the drain line. If the drain line is completely blocked, the condensate can overfill the drain pan, and spill out, causing water damage to a surrounding area. In most installations, a secondary or auxiliary drain pan is provided beneath the air handler unit and positioned to catch the overflow spillage from the primary condensation tray. The auxiliary condensation drain pan also typically has an outlet connected to a secondary condensate drain line, which directs it to the exterior of the home or building where the condensate can drip without damaging the home or building. The auxiliary condensate drain pan and secondary condensate drain line can also become clogged due to algae and/or fungus growing in the drain pan and/or the condensate drain line or from debris blocking the drain line.

Because the primary condensate tray and auxiliary drain pans are situated in a crawl space in an attic area, there would be little, if any, reason to know water spillage was occurring until the insulation and also the ceiling material is soaked through. However, at that point, substantial damage would have already occurred before the drain line(s) could be unblocked.

Many solutions have been attempted, such as chemical treatments, manual cleanings, and drain line purging systems, but none have had great effect of preventing the growth of algae and/or fungus in the drain pans and/or the condensate drain line which is a major cause of obstructions and collection of debris in the drain trays and pans and along the condensate drain system flow path.

Keen, U.S. Pat. No. 5,402,813, discloses an in-line algaecide dispenser for disposal upstream of a condensation line or cold-water drain line which provides an outlet for condensate from an air-conditioning unit, an ice-maker, or other device utilizing a condensation or drain line. A water-leachable algaecide in a tablet form is placed in the dispenser and gradually releases chlorine to a flowing stream of water to provide protection from clogging or plugging of the condensation or drain line by growth of cold-water algae.

Scaringe, U.S. Pat. No. 7,740,025, discloses method and apparatus for preventing clogging of condensate drain lines over an extended time using liquid or solid biocides, which includes a biocide delivery system that prevents the growth of bioorganic growth in the liquid trap using time release biocide tablets or liquid biocide. When using the solid biocide tablets erosion and dissolution of the tables is reduced. When using liquid biocides, combination of initial release followed by gradual release of residual liquid biocide in the drain water is attainable. Drain lines are prevented from clogging while being installed anywhere on the drain line upstream of the liquid trap. The apparatus can also be incorporated with a liquid trap, allowing placement anywhere in the drain line.

Gleason et al, U.S. Pat. No. 8,075,769, discloses an in-line P-trap chlorinator that ensures water contact with a water-leachable algaecide and/or antibacterial tablet while water is flowing through the P-trap, and after the flow of water has stopped. The in-line P-trap chlorinator is inserted in a condensation drain line of an air-conditioning or refrigerating unit to prevent formation of growth from bacteria or algae, which would plug the line, and/or to destroy any such growth already in the line. The inlet to the P-trap chlorinator is above the outlet, to prevent back-migration of harmful and/or corrosive gases, vapors, and/or liquids/mixtures/solutions. The P-trap chlorinator performs and combines the functions of a P-trap and a chlorinator. No additional P-trap is required.

Pearson, U.S. published applications 2009/0165868, 2011/0061745, and 2014/0116530, disclose systems that utilize pressurized municipal or household water from a water line to flush built up microbial material and/or non-microbial debris from an AC condensate drain line at a predetermined time based on either: a calendar date; an amount of time since a last automated introduction of a fluid into the condensate drain line; an amount of air conditioner operating time since the last automated introduction of the fluid into the condensate drain line; a duty cycle since the last automated introduction of the fluid into the condensate drain line; a number of air conditioning on-off cycles since the last automated introduction of the fluid into the condensate drain line; a sensed level of condensate in the condensate drain pan; a sensed differential pressure across a filter for the air conditioner; at least one sensed humidity; information received from a thermostat; information received from a network; information received from an external control system; or user specified configuration information operable to affect the determined time. These systems do not come on automatically upon the operation of the air conditioner, and do not specifically mention the chemical action of the chlorine in the water for preventing growth of microbial material.

SUMMARY OF THE INVENTION

The present invention overcomes the aforementioned problems and is distinguished over the prior art in general, and these patents in particular, by an automated primary condensate drain line chlorination system for introducing chlorine and algaecides into a primary condensate drain line of a central air conditioning system upon operation of the air conditioning system to prevent microbial growth and clogging. The system includes a first T-fitting installed in an existing municipal water supply line that contains chlorine and algaecides, and a second T-fitting installed between an outlet of an existing primary condensation tray of the central air conditioning system and the existing primary condensate drain line. A water supply line extending between the perpendicular leg of the first T-fitting and the perpendicular leg of the second T-fitting. A normally closed solenoid valve is installed in the water supply line between the perpendicular leg of the first T-fitting and the perpendicular leg of the second T-fitting, the solenoid of the solenoid valve operatively connected with, and powered by, the existing electrical circuit of the thermostat and fan motor of the central air conditioning system, and the flow path of the solenoid valve configured to allow a small amount of fluid to pass through the valve in its open position. The solenoid valve is opened automatically upon operation of the fan of the evaporator unit of the central air conditioning system and a small amount of water from the existing municipal water supply line flows through the solenoid valve and into the primary condensation tray and the primary condensate drain line. The chlorine and chloramine constituents in the municipal water effectively prevent the growth of algae and/or fungus in the primary condensate drain tray and condensate drain line which cause obstructions and collection of debris in the drain tray and along the condensate drain system flow path. In a modification, the solenoid valve has a timer which can be programmed to remain open for a selected period of time after the fan ceases to operate.

A backflow prevention device may be installed in the water supply line between the first T-fitting and the inlet of the solenoid valve to protect potable water supplies that are connected with the existing municipal water supply line from contamination or pollution due to backflow.

DETAILED DESCRIPTION OF THE INVENTION

The present invention is directed to an automated primary condensate drain line chlorination system and method which automatically introduces municipal water containing chlorine and algaecides into the primary condensate tray and drain line of an air conditioning system upon operation of the air conditioning system.

Figure 1:
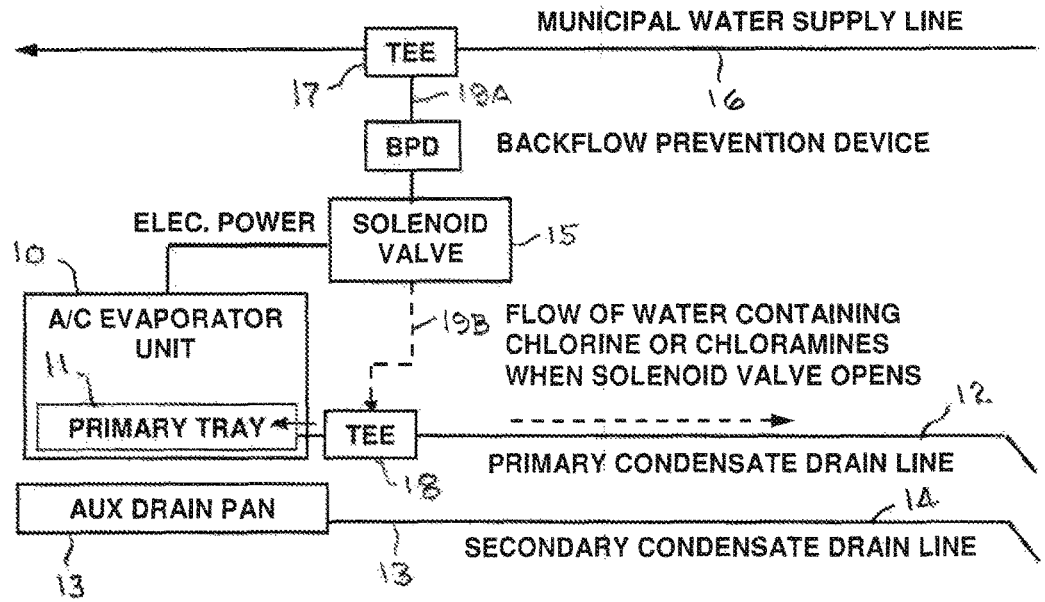
FIG. 1 is a block diagram of an automated primary condensate drain line chlorination system and method which automatically introduces water containing chlorine and algaecides into the primary condensate drain line of an air conditioning system upon operation of the air conditioning system, in accordance with a first embodiment of the invention.
Figure 2:
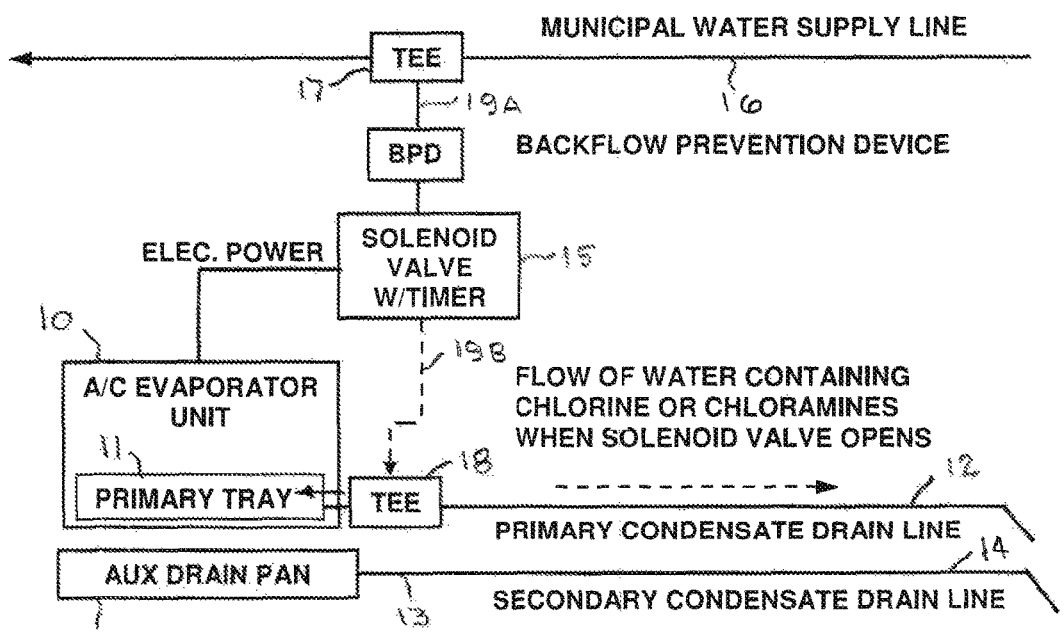
FIG. 2 is a block diagram of a modification of the automated primary condensate drain line chlorination system and method which automatically introduces water containing chlorine and algaecides into the primary condensate drain line of an air conditioning system upon operation of the air conditioning system and for a period of time after operation.

Referring to the drawings by numerals of reference, there is shown schematically in FIG. 1, a first embodiment of the present invention, and in FIG. 2, a modification of the first embodiment.

An evaporator unit 10 of a conventional central air conditioning system is disposed inside an air handler unit located in an attic crawl space of the home or building to be conditioned, and is connected in fluid communication with a conventional condenser unit located outside of the home or building (conventional and therefore not shown). In operation, the condenser unit condenser cools the refrigerant which loses its heat to the ambient air outside of the home or building and condenses into its liquid state. The cooled refrigerant is then carried into the home or building where it passes through the evaporator coils. Inside the air handling unit, a motor-driven fan passes air from within the conditioned space over the evaporator coils, transferring heat from the inside air to the coils and blows the cooled air into the conditioned space (conventional and therefore not shown).

During the refrigeration cycle, moisture condenses on the coils of the evaporator unit 10 and drips into a primary condensation pan or tray 11 located beneath the evaporator coils. The primary condensation pan or tray 11 typically has an outlet connected to a primary condensate drain line 12, which directs it through a P-trap and to a drain, sewer system, or an outside area.

In the illustrated example, a secondary or auxiliary drain pan 13 is provided beneath the evaporator unit 10 and primary condensation tray 11 in the air handler unit, and is positioned to catch the overflow spillage from the primary condensation tray. The auxiliary condensation drain pan 13 also has an outlet connected to a secondary condensate drain line 14, which directs it to the exterior of the home or building.

In the present invention (FIGS. 1 and 2), a normally closed solenoid valve 15 is installed between the primary condensation pan or tray 11 and an existing municipal water supply line 16 which contains chlorine and algaecides, that typically runs through the attic or crawl space of the home or building to be conditioned. More particularly, a first T-fitting 17 is installed in the municipal water supply line 16 and a second T-fitting 18 is installed between the outlet of the primary condensation pan or tray 11 and the primary condensate drain line 12. The perpendicular leg of the first T-fitting 17 is connected by a first segment of a water supply line 19A to the inlet of the solenoid valve 15, and a second segment of the water supply line 19B is connected to the perpendicular leg of the second T-fitting 18.

A backflow prevention device BPD may be installed in the first segment of the water supply line 19A between the first T-fitting 17 and the inlet of the solenoid valve 15 to protect the potable water supplies that are connected with the existing municipal water supply line 16 from contamination or pollution due to backflow.

The solenoid of the solenoid valve 15 is operatively connected with, and powered by, the existing electrical circuit of the thermostat and fan motor. The flow path bore of the solenoid valve 15 is configured to allow a small amount of fluid to pass through the valve in its open position.

In the embodiment of FIG. 1, when the fan is in operation, controlled by the thermostat, the solenoid valve 15 opens and a small amount of water from the existing municipal water supply line 16 flows through the solenoid valve and into the primary condensation tray 11 and the primary condensate drain line 12.

The modification of the system of FIG. 2 only differs from the above described system in that the solenoid valve 15 is provided with a timer which can be programmed to remain open for a selected period of time after the fan ceases to operate.

The present system is a significant improvement over conventional methods because it automatically supplies municipal water containing chlorine and algaecides into the primary condensation tray 11 and the primary condensate drain line 12 upon operation of the air conditioning system.

The EPA and many municipalities require treated tap water to have a detectable level of chlorine and/or chloramines (a combination of chlorine and ammonia) to help prevent contamination. The chlorine and chloramine constituents in the municipal water are also very effective disinfectants and prevent the growth of algae and/or fungus in the condensate drain trays and condensate drain lines which is a major cause of obstructions and collection of debris in the drain trays and pans and along the condensate drain system flow path.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. An automated primary condensate drain line chlorination system for introducing chlorine and algaecides into a primary condensate drain line of a central air conditioning system upon and a selected period of time after operation of the air conditioning system to prevent microbial growth in a primary condensate drain tray, the condensate drain line, and along a condensate drain system flow path, comprising:
  a first T-fitting installed in an existing municipal water supply line that contains chlorine and algaecides, the first T-fitting having a perpendicular leg configured to divert a portion of the municipal water from the water supply line;
  a second T-fitting installed between an outlet of an existing primary condensation tray of the central air conditioning system and the existing primary condensate drain line and having a perpendicular leg;
  a water supply line extending between the perpendicular leg of the first T-fitting and the perpendicular leg of the second T-fitting; and
  a normally closed solenoid valve with a programmable timer installed in the water supply line between the perpendicular leg of the first T-fitting and the perpendicular leg of the second T-fitting, a solenoid of the solenoid valve operatively connected with, and powered by, an existing electrical circuit of a thermostat and fan motor of the central air conditioning system, and the solenoid valve having a flow path bore configured to allow a small amount of the municipal water containing chlorine and algaecides to pass through the valve in its open position; wherein
  the solenoid valve is opened automatically upon operation of a fan of an evaporator unit of the central air conditioning system and the programmable timer is programmed to maintain the valve open for the selected period of time after the fan ceases to operate to allow the small amount of the municipal water containing chlorine and algaecides from the existing municipal water supply line to continue flowing through the solenoid valve, through the second T-fitting, and into both the primary condensation tray and the primary condensate drain line for the selected period of time; and
  the chlorine and algaecide constituents in the municipal water effectively prevent the growth of algae and/or fungus in both the primary condensate drain tray and the condensate drain line, and along the condensate drain system flow path.

\* \* \* \* \*